UNITED STATES PATENT OFFICE.

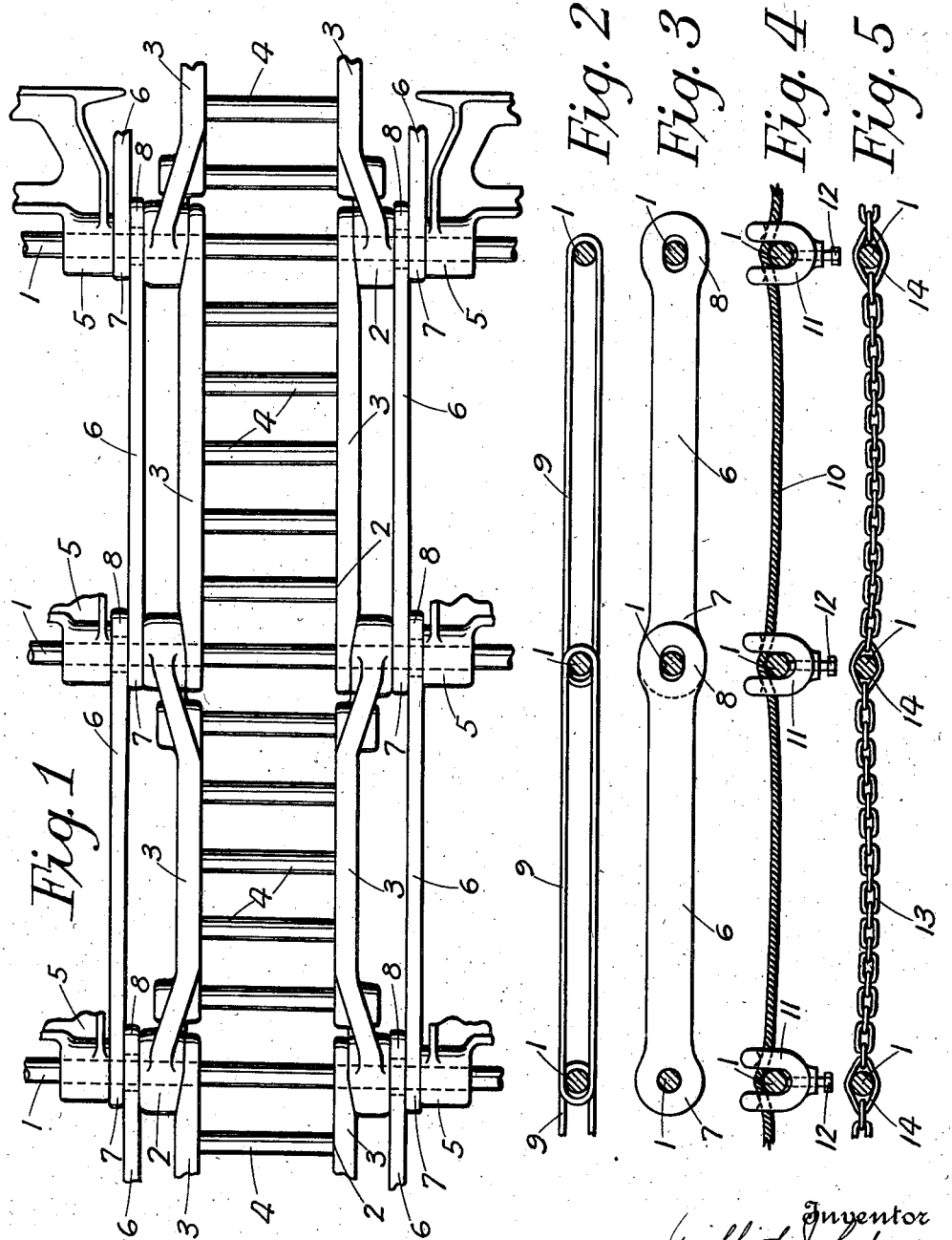

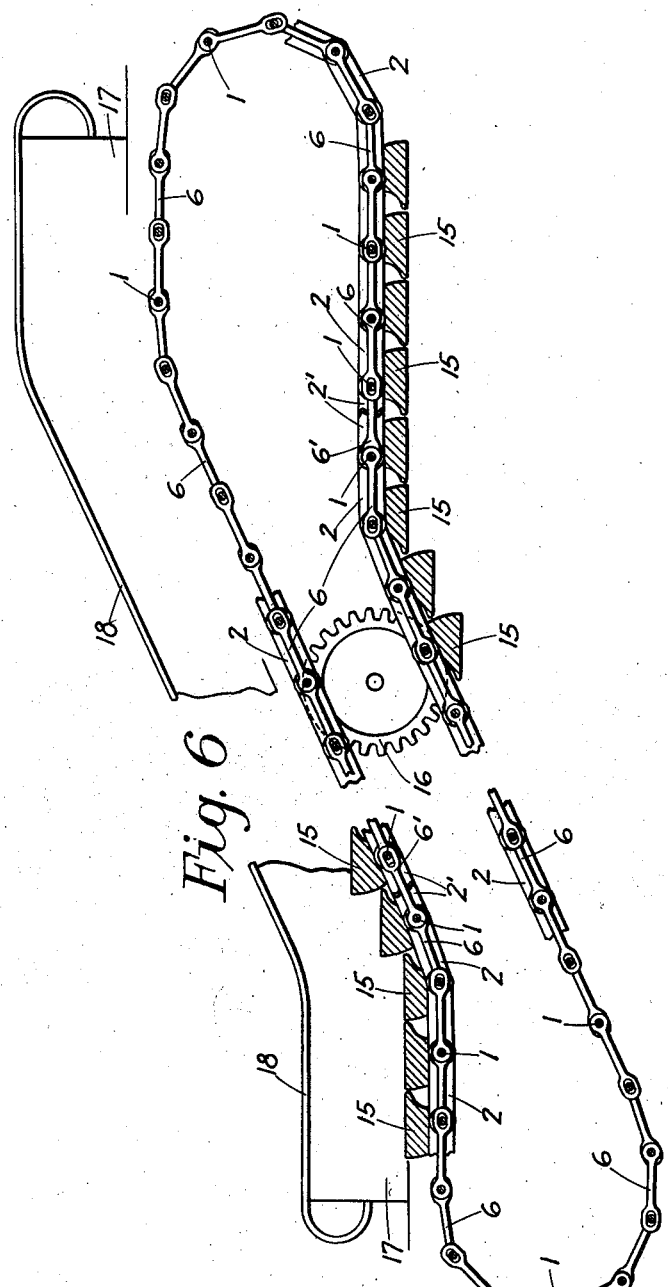

GRIFFITH JOHN, OF YONKERS, NEW YORK, ASSIGNOR TO OTIS ELEVATOR COMPANY, OF JERSEY CITY, NEW JERSEY, A CORPORATION OF NEW JERSEY.

SAFETY DEVICE FOR CONVEYERS.

1,300,401.  Specification of Letters Patent.  Patented Apr. 15, 1919.

Application filed December 5, 1917. Serial No. 205,493.

*To all whom it may concern:*

Be it known that I, GRIFFITH JOHN, a subject of the King of Great Britain, residing in Yonkers, in the county of Westchester and State of New York, have invented a new and useful Improvement in Safety Devices for Conveyers, of which the following is a specification.

My invention relates to safe-guarding apparatus for that class of conveyors used to transport passengers or freight from one point to another by means of a continuously moving support upon which the load rests, such support being of sectional construction, the sections being joined together and the whole apparatus being propelled through a driving chain. More specifically, the invention is an auxiliary chain or linkage in conjunction with the driving chain to take the place of the latter in the event of a breakage in the same, and so prevent any accident or damage to the conveyer or to the load which might otherwise result.

The object of the invention is to make the provision in an apparatus of the class described of automatic means for maintaining the driving and connecting chain intact and capable of continued operation without accident, when, due to the strain imposed thereon, or for other reason, a break occurs in any of the sections of the chain. Further objects of the invention will appear hereinafter. In the usual types of continuously moving conveyers or moving stairways, the only connections between the sections or steps are the links of the driving chain upon which falls the strain of drawing and supporting the load in its ascent, as well as the strain due to engagement with a driving sprocket. Thus owing to the severe duty imposed on the chain, breaks therein are a common occurrence, and when a link becomes severed the only connection between the adjacent sections of the conveyer is removed with the result of a jamming of the apparatus and further damage to the conveyer, and with the possibility of an accident to the load.

To meet this condition, I have provided in my invention additional connecting members between the sections of the conveyer, which members are preferably so constructed as to be slightly longer than the links in the driving chain and thus subjected to no strain or duty until the occurrence of a break in the driving chain, in which event they assume a part or all of the duty of the latter in maintaining a continuity of connection between the sections of the conveyer. I have suggested various forms of the invention, illustrating clearly the feasibility of its application to conveyer systems already in use as well as to new machines. Obviously the auxiliary connecting members might, if so desired, be made the same length as the links of the driving chain and so bear a part of the duty in the normal operation of the apparatus, although I believe the arrangement here shown to be the preferable one.

In the accompanying drawings, Figure 1 is a detailed plan view of a section of the driving chain of a conveyer, in conjunction with auxiliary or safety links. Figs. 2, 3, 4, and 5 are side elevations of several variations in the character and construction of auxiliary connecting members for the sections of a conveyer. Fig. 6 is a side elevation of the essential parts of a moving stairway, showing an embodiment of a preferred form of my invention and illustrating its operation. Similar characters of reference indicate like parts throughout the several figures.

In all the figures, the rods 1 are a series of axles to which transporting sections or steps are suitably fixed, these sections being connected by links of a driving chain all in a manner now well understood in the art.

Referring to Fig. 1, the driving chain links 2 connecting the through rods or axles 1, are of varied construction in alternate links, but are all of the same length and each comprises essentially two side bars or shroud plates 3 connected by equally spaced cross pins 4. The step brackets 5, here shown broken away, are supported by the axles. Situated on either side of the links 2 and also connecting the axles 1, are auxiliary safety links 6, here shown in their preferred form, in which one end 7 of the link fits closely to the axle, and the opposite end 8 is provided with an elongated opening through which the succeeding axle passes. The auxiliary links having a greater distance than have the driving links between the extremities of their two openings are not subjected to any strain in normal operation of the apparatus. From this illustration, it will be seen that in the event of a breaking of either shroud plate, 3, the resultant separation at the point of fracture and slight twisting of the parts of the link, will cause the auxiliary link, 6, on the side of the break, to assume the duty of the broken shroud plate, and so prevent a breaking of the opposite shroud plate, permitting a continued operation of the conveyer.

Fig. 2, shows a side elevation of one type of auxiliary link, 9, having an opening slightly longer than the normal distance between the opposite side of two successive axles, 1. This link may be forged and of inexpensive construction.

Fig. 3, shows in side elevation, the preferred form, 6, of auxiliary link indicated in Fig. 1. This link may be made as a casting and drilled at one end, 7, with a round hole to fit closely the axle 1, and drilled at the opposite end, 8, with an elongated hole to engage the successive axle and project beyond the same as shown. Obviously this link might be constructed with elongated openings at both ends if desired.

Fig. 4, shows an auxiliary or safety cable, 10, to be used instead of links and fastened to the axles, 1, by clamps 11, in which the manipulation of set screws, 12, brings the cable into tight engagement with the axles. The cable is clamped in such a way as to hang slightly slack between the axles under normal conditions.

Fig. 5 shows an auxiliary or safety chain 13 constructed of ordinary links of comparatively short length, and with specially designed links, 14, at equal intervals to engage the axles, 1, the intervals being of such length as to allow the chain to hang slightly slack under normal conditions.

In Fig. 6, I show some of the essential parts in a complete moving stairway system in which a series of axles, 1, is connected by auxiliary links 6 of the type shown in Fig. 3. The main driving links 2 connecting the axles, 1, and the steps, 15, mounted on the latter are shown broken away to illustrate more clearly the construction and position of the auxiliary links. The apparatus is driven, in a well known manner, by a sprocket or spur wheel, 16, which engages the axles, 1, and the cross pins of the links, 2. The side paneling, 17, and hand rail, 18, are indicated. Driving chain links, 2', are shown with their shroud plates on the nearer side broken, while auxiliary links, 6', are shown engaging the adjacent axles and assuming the duty of the broken shroud plates.

A break in the driving chain usually occurs as a breaking first of one of the shroud plates in a link and then, owing to the imposition of the entire load upon the opposite shroud plate, and the uneven strain imposed thereon, especially when passing over the driving sprocket, the second shroud plate also breaks, resulting in a complete failure of the link and a severing of the only connection between the two adjacent sections of the conveyer; and resulting with a continued operation of the driving mechanism, in further damage to the conveyer, and possible accident to the load. It will be seen then that with the auxiliary linkage which I provide in my invention, a breaking of one of the shroud plates will result in the immediate replacement thereof by the safety link on that side of the chain, with the result that no excessive strain is imposed on the opposite shroud plate which will naturally remain intact. With a link in such condition, the normal operation of the conveyer might continue indefinitely without accident, but it is to be assumed that the break in the link will be discovered and repaired within a reasonable length of time. In the event of the breaking of both shroud plates in a link, the safety links on both sides thereof will be brought into use, and the connection between the adjacent sections of the conveyer will still be maintained.

Obviously those skilled in the art may make various changes in the construction and arrangement of parts without departing from the spirit and scope of my invention and I desire therefore not to be limited to the construction here shown.

I claim—

1. In a conveyer apparatus, a series of axles, a drive linkage connecting the latter, and an auxiliary linkage connecting the same.

2. In a conveyer apparatus, a series of axles, a drive linkage connecting the latter, and an auxiliary linkage on both sides of the drive linkage connecting the axles.

3. In a conveyer apparatus, a series of axles, a series of drive links of uniform length connecting the axles, and a series of auxiliary links of uniform length, and of greater length than the said links connecting the axles.

4. In a conveyer apparatus, a series of axles; drive links connecting the axles, the links having openings to engage the axles, auxiliary links connecting the axles, openings in the said links to engage the axles, the distance between the extremities of the openings in each auxiliary link being greater than the distance between the extremities of the openings in each drive link.

5. In a conveyer apparatus, a series of axles, drive links connecting the same, and auxiliary links each having an opening at one end to fit closely around one of the axles and a larger opening at the opposite end to fit loosely on the successive axle.

6. In a conveyer apparatus, a series of axles, drive links connecting the same, and auxiliary links connecting the axles each having an opening at one end to fit closely around one of the axles and an opening at the opposite end to fit around and project beyond the successive axle.

7. In a conveyer apparatus, a series of axles, a drive linkage connecting the same and auxiliary links connecting each axle with the adjacent axles on both sides thereof.

In testimony whereof, I have signed my name to this specification in the presence of two subscribing witnesses.

GRIFFITH JOHN.

Witnesses:
W. H. BRADY,
M. E. DUFF.